(12) United States Patent
Li

(10) Patent No.: US 9,857,524 B2
(45) Date of Patent: Jan. 2, 2018

(54) LIQUID CRYSTAL MODULE AND ELECTRONIC DEVICE

(71) Applicant: HUAWEI DEVICE (DONGGUAN) CO., LTD., Dongguan (CN)

(72) Inventor: Wei Li, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 15/035,330

(22) PCT Filed: Nov. 20, 2013

(86) PCT No.: PCT/CN2013/087539
§ 371 (c)(1),
(2) Date: May 9, 2016

(87) PCT Pub. No.: WO2015/074202
PCT Pub. Date: May 28, 2015

(65) Prior Publication Data
US 2016/0274289 A1 Sep. 22, 2016

(51) Int. Cl.
*G02F 1/1335* (2006.01)
*F21V 8/00* (2006.01)
*G02F 1/1333* (2006.01)

(52) U.S. Cl.
CPC ........... *G02B 6/005* (2013.01); *G02B 6/0053* (2013.01); *G02B 6/0055* (2013.01);
(Continued)

(58) Field of Classification Search
None
See application file for complete search history.

(56) References Cited

U.S. PATENT DOCUMENTS

2008/0151138 A1\* 6/2008 Tanaka .............. G02F 1/133308
349/58
2010/0085727 A1 4/2010 Igarashi et al.
(Continued)

FOREIGN PATENT DOCUMENTS

CN 201242640 Y 5/2009
CN 202521397 U 11/2012
(Continued)

OTHER PUBLICATIONS

Partial English Translation and Abstract of Chinese Patent Application No. CN202521397, Nov. 7, 2016, 9 pages.
(Continued)

*Primary Examiner* — Richard Kim
(74) *Attorney, Agent, or Firm* — Conley Rose, P.C.

(57) ABSTRACT

A liquid crystal module and an electronic device are provided. The liquid crystal module includes a liquid crystal panel including a light-admitting area and a light-shielding area located at an edge of the light-admitting area, a light conversion film disposed opposite to the liquid crystal panel, where the light conversion film includes a first side portion disposed opposite to the light-shielding area, and a width of the first side portion is greater than or equal to 0.8 mm, a brightness enhancement film disposed between the liquid crystal panel and the light conversion film, and a supporting portion disposed between the first side portion and the light-shielding area, and configured to support the liquid crystal panel.

16 Claims, 2 Drawing Sheets

(52) U.S. Cl.
CPC .. *G02F 1/133308* (2013.01); *G02F 1/133512* (2013.01); *G02F 1/133528* (2013.01); *G02F 1/133617* (2013.01); *G02F 2001/133317* (2013.01); *G02F 2001/133388* (2013.01); *G02F 2001/133614* (2013.01)

(56) References Cited

U.S. PATENT DOCUMENTS

| | | |
|---|---|---|
| 2011/0236643 A1 | 9/2011 | Tsubouchi et al. |
| 2012/0113672 A1 | 5/2012 | Dubrow et al. |
| 2014/0118911 A1* | 5/2014 | Tang ................. G02F 1/133308 361/679.01 |
| 2015/0355484 A1* | 12/2015 | Guo ................. G02F 1/133608 349/62 |

FOREIGN PATENT DOCUMENTS

| | | |
|---|---|---|
| CN | 103228983 A | 7/2013 |
| JP | 2008123969 A | 5/2008 |
| JP | 2010092705 A | 4/2010 |
| JP | 2010217524 A | 9/2010 |
| JP | 2010271661 A | 12/2010 |
| JP | 2011119131 A | 6/2011 |
| JP | 2012168340 A | 9/2012 |
| KR | 20120056001 A | 6/2012 |
| KR | 20130123718 A | 11/2013 |

OTHER PUBLICATIONS

Foreign Communication From a Counterpart Application, European Application No. 13897739.2, Extended European Search Report dated Oct. 18, 2016, 11 pages.
Foreign Communication From a Counterpart Application, PCT Application No. PCT/CN2013/087539, English Translation of International Search Report dated Aug. 27, 2014, 2 pages.
Foreign Communication From a Counterpart Application, PCT Application No. PCT/CN2013/087539, English Translation of Written Opinion dated Aug. 27, 2014, 6 pages.
Machine Translation and Abstract of Japanese Publication No. JP2008123969, May 29, 2008, 14 pages.
Machine Translation and Abstract of Japanese Publication No. JP2010217524, Dec. 2, 2010, 15 pages.
Machine Translation and Abstract of Japanese Publication No. JP2010271661, Dec. 2, 2010, 11 pages.
Machine Translation and Abstract of Japanese Publication No. JP2011119131, Jun. 16, 2011, 15 pages.
Machine Translation and Abstract of Japanese Publication No. JP2012168340, Sep. 6, 2012, 10 pages.
Foreign Communication From a Counterpart Application, Japanese Application No. 2016-532632, Japanese Office Action dated Jun. 6, 2017, 3 pages.
Foreign Communication From a Counterpart Application, Japanese Application No. 2016-532632, English Translation of Japanese Office Action dated Jun. 6, 2017, 4 pages.

* cited by examiner

LIQUID CRYSTAL MODULE AND ELECTRONIC DEVICE

CROSS-REFERENCE TO RELATED APPLICATIONS

This application is a U.S. National Stage of International Application No. PCT/CN2013/087539, filed on Nov. 20, 2013, which is hereby incorporated by reference in its entirety.

TECHNICAL FIELD

The present disclosure relates to the field of electronic device technologies, and in particular, to a liquid crystal module and an electronic device.

BACKGROUND

Currently, as informational construction is booming, liquid crystal display devices used as terminals for displaying information, for example, televisions, computers, mobile phones, and electronic bulletin display screens, have become an indispensable part in our life and work.

A liquid crystal module of an existing liquid crystal display device using a quantum dot enhancement film generally includes a liquid crystal panel, a reflector, a plastic frame, a brightness enhancement sheet, a quantum dot enhancement film, and a light guide. The plastic frame provides support between the liquid crystal panel and the reflector. The brightness enhancement sheet, quantum dot enhancement film, and light guide are disposed between the liquid crystal panel and the reflector in an overlapping manner, and are located in the plastic frame.

Generally, a light-shielding layer at edges of a narrow-border liquid crystal panel has a width of approximately 0.8-1.4 millimeters (mm). It is assumed that the width of the light-shielding layer is the maximum value 1.4 mm in this case. To ensure that the edge of the liquid crystal panel can still be supported on the plastic frame in a case in which there are a manufacturing tolerance and a mounting tolerance, at least a width of 0.5 mm in the light-shielding layer is supported on the plastic frame. In addition, a gap of 0.15 mm should be maintained between the plastic frame and the quantum dot enhancement film. Therefore, the quantum dot enhancement film located below the light-shielding layer has a width of only 1.4 mm-0.5 mm-0.15 mm=0.75 mm.

However, according to inherent characteristics of the quantum dot enhancement film, when exposed to the air, an edge of the quantum dot enhancement film may be corroded by oxygen and moisture in the air. Therefore, generally a 0.8 mm-wide redundant area should be reserved at the edge of the quantum dot enhancement film.

Because 0.75 mm is less than 0.8 mm, after the liquid crystal module is used for a period of time, the edge of the quantum dot enhancement film may be corroded by the oxygen and moisture in the air, and a phenomenon of light leakage may occur at the edge of the foregoing liquid crystal module.

SUMMARY

Embodiments of the present disclosure provide a liquid crystal module and an electronic device, which resolve a technical problem in the prior art that after an edge of a quantum dot enhancement film of a liquid crystal module is corroded by oxygen and moisture in the air, light leakage may occur at the edge, and achieves a technical effect of preventing light leakage at an edge of a liquid crystal panel.

A first aspect of embodiments of the present disclosure provides a liquid crystal module, including a liquid crystal panel, including a light-admitting area and a light-shielding area located at an edge of the light-admitting area, a light conversion film disposed opposite to the liquid crystal panel, where the light conversion film includes a first side portion disposed opposite to the light-shielding area, and a width of the first side portion that is greater than or equal to 0.8 mm, a brightness enhancement film disposed between the liquid crystal panel and the light conversion film, and a supporting portion disposed between the first side portion and the light-shielding area, and configured to support the liquid crystal panel.

In a first possible implementation manner of the first aspect, the brightness enhancement film includes a second side portion that is disposed parallel with the supporting portion, between the first side portion and the light-shielding area.

With reference to the first aspect or the first possible implementation manner of the first aspect, in a second possible implementation manner of the first aspect, the supporting portion is made of a metal material.

With reference to the first aspect or the first or second possible implementation manner of the first aspect, in a third possible implementation manner of the first aspect, the liquid crystal module further includes a bearing portion for supporting the supporting portion, and a gap exists between the first side portion and the supporting portion.

With reference to the third possible implementation manner of the first aspect, in a fourth possible implementation manner of the first aspect, the supporting portion is bonded onto the bearing portion.

With reference to the third or fourth possible implementation manner of the first aspect, in a fifth possible implementation manner of the first aspect, the liquid crystal module further includes a light guide and a reflector, where the light guide is disposed between the reflector and the light conversion film, and the reflector is bonded onto the bearing portion.

With reference to the first aspect or the first or second possible implementation manner of the first aspect, in a sixth possible implementation manner of the first aspect, the liquid crystal module further includes a bearing portion for supporting the first side portion.

With reference to the first aspect or the first or second possible implementation manner of the first aspect, in a seventh possible implementation manner of the first aspect, the liquid crystal module further includes a bearing portion, where the bearing portion has an upper step surface that supports the supporting portion and a step surface that supports the first side portion.

With reference to the first aspect or the first or second possible implementation manner of the first aspect, in an eighth possible implementation manner of the first aspect, the liquid crystal module further includes a light-shielding tape, wherein the light-shielding tape is used to bond the supporting portion and the light-shielding area.

A second aspect of embodiments of the present disclosure provides an electronic device, including a liquid crystal panel, including a light-admitting area and a light-shielding area located at an edge of the light-admitting area, a light conversion film disposed opposite to the liquid crystal panel, where the light conversion film includes a first side portion disposed opposite to the light-shielding area, and a width of the first side portion is greater than or equal to 0.8 mm, a brightness enhancement film disposed between the liquid crystal panel and the light conversion film, and a supporting component, where the supporting component includes a supporting portion that is disposed between the first side portion and the light-shielding area and configured to support the liquid crystal panel.

With reference to the second aspect, in a first possible implementation manner of the second aspect, the supporting component is in a frame shape or a bar shape.

With reference to the second aspect or the first possible implementation manner of the second aspect, in a second possible implementation manner of the second aspect, the supporting component is disposed around an edge of the brightness enhancement film.

With reference to the second aspect or the first or second possible implementation manner of the second aspect, in a third possible implementation manner of the second aspect, the supporting portion is made of a metal material.

With reference to the second aspect or any one of the first to third possible implementation manners of the second aspect, in a fourth possible implementation manner of the second aspect, the electronic device further includes a bearing frame for supporting the supporting portion, and a gap exists between the first side portion and the supporting portion.

With reference to the second aspect or any one of the first to fourth possible implementation manners of the second aspect, in a fifth possible implementation manner of the second aspect, the supporting portion is bonded onto the bearing frame.

With reference to the second aspect or any one of the first to fifth possible implementation manners of the second aspect, in a sixth possible implementation manner of the second aspect, the electronic device further includes a light guide and a reflector, where the light guide is disposed between the reflector and the light conversion film, and the reflector is bonded onto the bearing frame.

With reference to the second aspect or any one of the first to sixth possible implementation manners of the second aspect, in a seventh possible implementation manner of the second aspect, the supporting component further includes a base portion that is disposed around an edge of the bearing frame and connected to the supporting portion.

With reference to the second aspect or any one of the first to seventh possible implementation manners of the second aspect, in an eighth possible implementation manner of the second aspect, the electronic device further includes a light-shielding tape used to bond the supporting portion and the light-shielding area.

The embodiments of the present disclosure have the following beneficial effects:

In the foregoing liquid crystal module and electronic device, a supporting portion is disposed between a first side portion and a light-shielding area, and the supporting portion is used to support a liquid crystal panel, thereby ensuring that in a case in which there are a manufacturing tolerance and a mounting tolerance, edges of the liquid crystal panel can be supported. In addition, the width of the first side portion is set to 0.8 mm or more than 0.8 mm, thereby ensuring that a light conversion film can have enough space in a redundant area. This resolves a technical problem in the prior art that after an edge of a quantum dot enhancement film of the liquid crystal module is corroded by oxygen and moisture in the air, the quantum dot enhancement film located below a light-shielding layer has a width of only 0.75 mm, and light leakage may occur at the edge, and achieves a technical effect of preventing light leakage at the edge of the liquid crystal panel.

DESCRIPTION OF EMBODIMENTS

Figure 1:
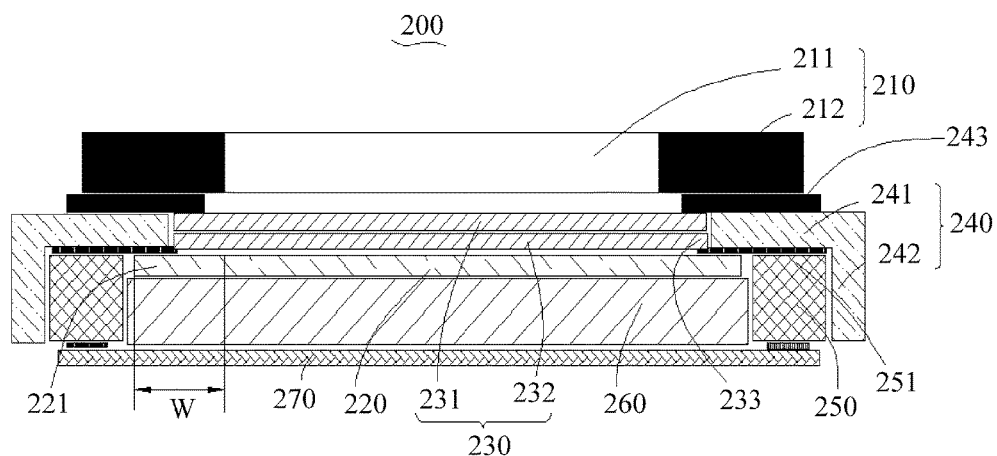
FIG. 1 is a schematic sectional view of a liquid crystal module according to a first exemplary implementation manner of the present disclosure.

Embodiments of the present disclosure provide a liquid crystal module and an electronic device, which resolves a technical problem in the prior art that after an edge of a quantum dot enhancement film of a liquid crystal module is corroded by oxygen and moisture in the air, light leakage may occur at the edge, and achieves a technical effect of preventing light leakage at an edge of a liquid crystal panel.

To solve the foregoing technical problem, a general idea in the technical solutions of the embodiments of the present disclosure is as follows:

A liquid crystal module includes a liquid crystal panel, including a light-admitting area and a light-shielding area located at an edge of the light-admitting area, a light conversion film disposed opposite to the liquid crystal panel, where the light conversion film includes a first side portion disposed opposite to the light-shielding area, and a width of the first side portion is greater than or equal to 0.8 mm, a brightness enhancement film disposed between the liquid crystal panel and the light conversion film, and a supporting portion disposed between the first side portion and the light-shielding area, and configured to support the liquid crystal panel.

An electronic device includes a liquid crystal panel, including a light-admitting area and a light-shielding area located at an edge of the light-admitting area, a light conversion film disposed opposite to the liquid crystal panel, where the light conversion film includes a first side portion disposed opposite to the light-shielding area, and a width of the first side portion is greater than or equal to 0.8 mm, a brightness enhancement film disposed between the liquid crystal panel and the light conversion film, and a supporting component, where the supporting component includes a supporting portion that is disposed between the first side portion and the light-shielding area and configured to support the liquid crystal panel.

In the foregoing liquid crystal module and electronic device, a supporting portion is disposed between a first side portion and a light-shielding area, and the supporting portion is used to support a liquid crystal panel, thereby ensuring that in a case in which there are a manufacturing tolerance and a mounting tolerance, edges of the liquid crystal panel can be supported. In addition, a width of the first side portion is greater than or equal to 0.8 mm, thereby ensuring that a light conversion film can have enough space in a redundant area. This resolves a technical problem in the prior art that after an edge of a quantum dot enhancement film of the liquid crystal module is corroded by oxygen and moisture in the air, the quantum dot enhancement film located below a light-shielding layer has a width of only 0.75 mm, and light leakage may occur at the edge, and achieves a technical effect of preventing light leakage at the edge of the liquid crystal panel.

For better understanding the foregoing technical solutions, the following describes the foregoing technical solutions in detail with reference to the drawings of the specification and specific implementation manners.

Embodiment 1

FIG. 1 shows a schematic sectional view of a liquid crystal module 200 according to a first implementation manner of the present disclosure. The liquid crystal module 200 includes a liquid crystal panel 210, a light conversion film 220, a brightness enhancement film 230, and a supporting component 240.

The liquid crystal panel 210 includes a light-admitting area 211 and a light-shielding area 212 located at an edge of the light-admitting area 211. The light-admitting area 211, namely, an Active Area, also called a display area, is used to display a picture or data. The light-shielding area 212, namely, a Black Matrix (BM), also called a black light-shielding layer, is used to shield light and prevent emission of light in the liquid crystal module 200, which may otherwise cause a phenomenon of light leakage. The liquid crystal panel 210 may include an upper polarizer, light filter glass, a light filter, a black matrix, a liquid crystal layer, a thin film transistor, thin film transistor glass, a lower polarizer, and a backlight sheet that are disposed in sequence in an overlapping manner.

The light conversion film 220 is disposed opposite to the liquid crystal panel 210, and used to change a light frequency. The light conversion film 220 includes a first side portion 221 disposed opposite to the light-shielding area 212, and a width W of the first side portion 221 is greater than or equal to 0.8 mm. The first side portion 221 is a redundant area of the light conversion film 220, that is, the light conversion film 220 includes an effective area opposite to the light-admitting area 211 and a redundant area connected to a first edge of the effective area. The width W of the first side portion 221 is a minimum distance between the first edge and a second edge in the redundant area, where the second edge is far away from the first edge.

In this implementation manner, the light conversion film 220 is a quantum dot enhancement film. The quantum dot enhancement film is a quantum dot matrix that is made of quantum dot materials doped with an adhesive or the like, and is then coated with a protection film on an upper surface and a protection film on a lower surface, where the quantum dot materials may emit red light and green light when excited by blue light. After blue light is radiated onto the quantum dot enhancement film, a part of the blue light is converted into red light and green light, which are finally mixed to form white light. Because of cutting, an edge of the quantum dot enhancement film may be exposed in the air, and the quantum dot materials may be corroded gradually from outside to inside by oxygen and moisture in the air. As the corrosion depth increases, a corrosion speed decreases gradually, and in a normal use condition, the corrosion depth is approximately 0.6-0.8 mm. In other implementation manners, the light conversion film 220 may be any light conversion film that can change a light frequency and whose edge may be corroded, and is not limited to a quantum dot enhancement film.

The brightness enhancement film 230 is disposed between the liquid crystal panel 210 and the light conversion film 220, and used to change a direction of light. The brightness enhancement film 230 includes an upper brightness enhancement sheet 231 and a lower brightness enhancement sheet 232. The upper brightness enhancement sheet 231 is disposed between the liquid crystal panel 210 and the lower brightness enhancement sheet 232. The lower brightness enhancement sheet 232 is disposed between the upper brightness enhancement sheet 231 and the light conversion film 220. A function of the upper brightness enhancement sheet 231 and lower brightness enhancement sheet 232 is to converge light directions in a direction vertical to a display screen such that brightness in the direction vertical to the display screen is increased.

A size of the brightness enhancement film 230 is greater than a size of the light-admitting area 211 of the liquid crystal panel 210. Therefore, the brightness enhancement film 230 further includes a second side portion 233 disposed between the first side portion 221 and the light-shielding area 212. The second side portion 233 is bonded onto the light-shielding area 212 using a light-shielding tape 243. In addition, the size of the brightness enhancement film 230 is smaller than a size of the light conversion film 220.

The supporting component 240 includes a supporting portion 241 and a base portion 242 connected to the supporting portion 241. The supporting portion 241 is disposed between the first side portion 221 and the light-shielding area 212, and used to support the liquid crystal panel 210. The supporting portion 241 is bonded onto the light-shielding area 212 using the light-shielding tape 243.

For example, the supporting component 240 may be in a frame shape, and disposed around an edge of the brightness enhancement film 230, or may partly overlap an edge of the brightness enhancement film 230. The supporting component 240 may be in contact with a part of the light-shielding area 212 using the supporting portion 241, or may be in contact with the entire light-shielding area 212. That is, the supporting portion 241 may be disposed only in an area in which light leakage may occur, and not disposed in an area in which light leakage may never occur. In addition, the supporting portion 240 may also be in a bar shape or a block shape, and directly disposed in an area in which light leakage may occur.

In this implementation manner, the supporting component 240 is in a frame shape to facilitate assembly. When the supporting component 240 is disposed around the edge of the brightness enhancement film 230, the supporting portion 241 and the second side portion 233 are disposed in parallel between the first side portion 221 and the light-shielding area 212, and bonded onto the light-shielding area 212 using the light-shielding tape 243. This not only avoids overlapping of the supporting portion 241 and the brightness enhancement film 230 and reduces a thickness of the liquid crystal module 200, but also achieves a technical effect of further preventing light leakage.

The supporting component 240 may be made of a metal material, or may be made of a plastic material. Alternatively, the supporting portion 241 may be made of a metal material, and the base portion 242 may be made of a plastic material. In this implementation manner, the supporting component 240 may be made of a metal material. Because a thickness of the supporting portion 241 made of a metal material is less than a thickness of the supporting portion 241 made of a plastic material, the thickness of the liquid crystal module 200 is reduced.

The liquid crystal module 200 further includes a bearing frame 250. The bearing frame 250 may be a plastic frame, or may be a metal frame, which may be selected by a user according to a requirement. The bearing frame 250 is disposed around an edge of the light conversion film 220, and a gap may exist between the bearing frame 250 and the light conversion film 220. In this case, the plastic frame does not need to directly support the liquid crystal panel 210 any longer. Therefore, a size of the bearing frame 250 may be designed in a case in which it is ensured that the light conversion film 220 has enough space in the redundant area.

The bearing frame 250 includes a bearing portion 251 for supporting the supporting portion 241, where the bearing portion 251 is bonded onto the supporting portion 241. A surface of the bearing portion 251 for supporting the supporting portion 241 is higher than an upper surface of the light conversion film 220 such that a gap exists between the first side portion 221 of the light conversion film 220 and the supporting portion 241, thereby preventing deformation of the light conversion film 220 under pressure of the supporting portion 241. In addition, in this implementation manner, when the supporting component 240 is in a frame shape, the bearing frame 250 is enclosed in the base portion 242.

In this implementation manner, a function of the bearing frame 250 is to support the supporting portion 241. In other implementation manners, the bearing frame 250 may not be disposed, but the base portion 242 on the supporting component 240 is directly used to support the supporting portion 241, or the base portion 242 may not be disposed, but the supporting portion 241 is directly fixed on a housing of the electronic device.

The liquid crystal module 200 further includes a light guide 260 and a reflector 270. The light guide 260 is disposed between the reflector 270 and the light conversion film 220. The reflector 270 may be bonded onto one end of the bearing portion 251 opposite to the supporting portion 241. The light guide 260 is used to convert a side light source into a plane light source, and emit light evenly. The reflector 270 reflects a light source radiated onto the reflector 270 by the light guide 260, back to the light guide 260.

In the foregoing liquid crystal module 200, a supporting portion 241 is disposed between a first side portion 221 and a light-shielding area 212, and the supporting portion 241 is used to support a liquid crystal panel 210, thereby ensuring that in a case in which there are a manufacturing tolerance and a mounting tolerance, edges of the liquid crystal panel 210 can be supported. In addition, a width W of the first side portion is set to 0.8 mm or more than 0.8 mm, thereby ensuring that a light conversion film 220 can have enough space in a redundant area. This resolves a technical problem in the prior art that after an edge of a quantum dot enhancement film of the liquid crystal module is corroded by oxygen and moisture in the air, the quantum dot enhancement film located below a light-shielding layer has a width of only 0.75 mm, and light leakage may occur at the edge, and achieves a technical effect of preventing light leakage at the edge of the liquid crystal panel.

By disposing the supporting component 240 in a frame shape, assembly is facilitated. By disposing the supporting portion 241 and the second side portion 233 in parallel between the first side portion 221 and the light-shielding area 212, overlapping of the supporting portion 241 and the brightness enhancement film 230 is avoided, and the thickness of the liquid crystal module 200 is reduced.

By bonding the supporting portion 241 and the second side portion 233 onto the light-shielding area 212 using the light-shielding tape 243, the technical effect of further preventing light leakage is achieved.

By disposing the supporting component 240 around the edge of the brightness enhancement film 230, overlapping of the supporting portion 241 and the brightness enhancement film 230 is avoided, and the thickness of the liquid crystal module 200 is reduced.

By disposing the supporting component 240 made of a metal material, the thickness of the liquid crystal module 200 is reduced because the thickness of the supporting portion made of a metal material is less than the thickness of the supporting portion made of a plastic material. By leaving a gap between the first side portion of the light conversion film and the supporting portion, deformation of the light conversion film under pressure of the supporting portion is prevented.

Embodiment 2

Figure 2:
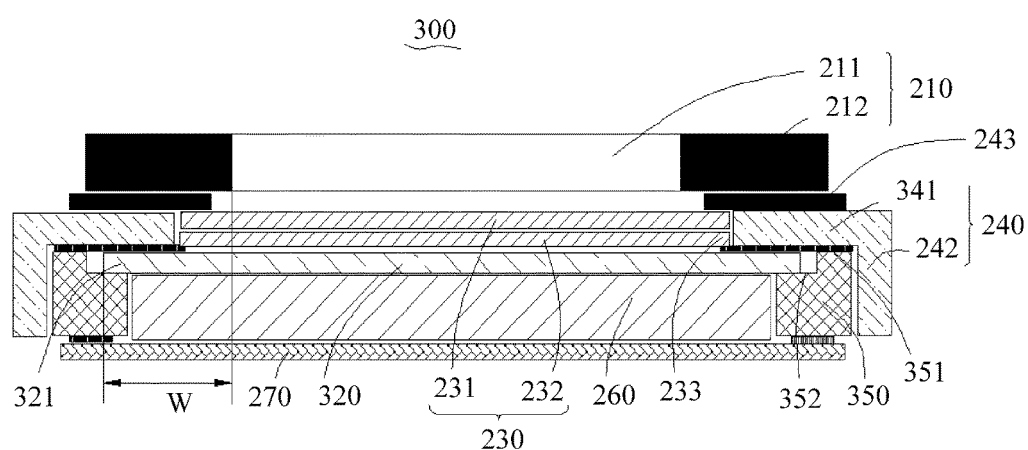
FIG. 2 is a schematic sectional view of a liquid crystal module according to a second exemplary implementation manner of the present disclosure.

FIG. 2 shows a schematic sectional view of a liquid crystal module 300 according to a second exemplary implementation manner of the present disclosure. In the liquid crystal module 300, except that location relationships between a light conversion film 320, a supporting portion 341, and a bearing frame 350 are different from location relationships between the light conversion film 220, the supporting portion 241, and the bearing frame 250 in the liquid crystal module 200, other components, functions of the components, and relationships between the components are the same. Same parts are not further described herein.

When a width of a light-shielding area 212 at an edge of a liquid crystal panel 210 is small, a width of the bearing frame 350 for supporting the supporting portion 341 may be reduced, to ensure that the light conversion film 320 has enough space in a redundant area. The bearing frame 350 may be disposed in a step shape. That is, it has an upper step surface 351 that supports the supporting portion 341, and a step surface 352 that is lower than the upper step surface 351 and used to support a first side portion 321 of the light conversion film 320. In other words, a part of an inner side of the bearing frame 250 in the liquid crystal module in Embodiment 1 is cut off, to leave enough space, which ensures that the redundant area of the light conversion film 320 is greater than or equal to 0.8 mm, that is, a width W of the first side portion 321 is greater than or equal to 0.8 mm, and the freed space may further be used to support the first side portion 321 of the light conversion film 320.

Likewise, in the foregoing liquid crystal module 300, a supporting portion 341 is disposed between a first side portion 321 and a light-shielding area 212, and the supporting portion 341 is used to support a liquid crystal panel 210, thereby ensuring that in a case in which there are a manufacturing tolerance and a mounting tolerance, edges of the liquid crystal panel 210 can be supported. In addition, a width W of the first side portion is set to 0.8 mm or more than 0.8 mm, thereby ensuring that a light conversion film 320 can have enough space in a redundant area. This resolves a technical problem in the prior art that after an edge of a quantum dot enhancement film of the liquid crystal module is corroded by oxygen and moisture in the air, the quantum dot enhancement film located below a light-shielding layer has a width of only 0.75 mm, and light leakage may occur at the edge, and achieves a technical effect of preventing light leakage at the edge of the liquid crystal panel.

Embodiment 3

Figure 3:
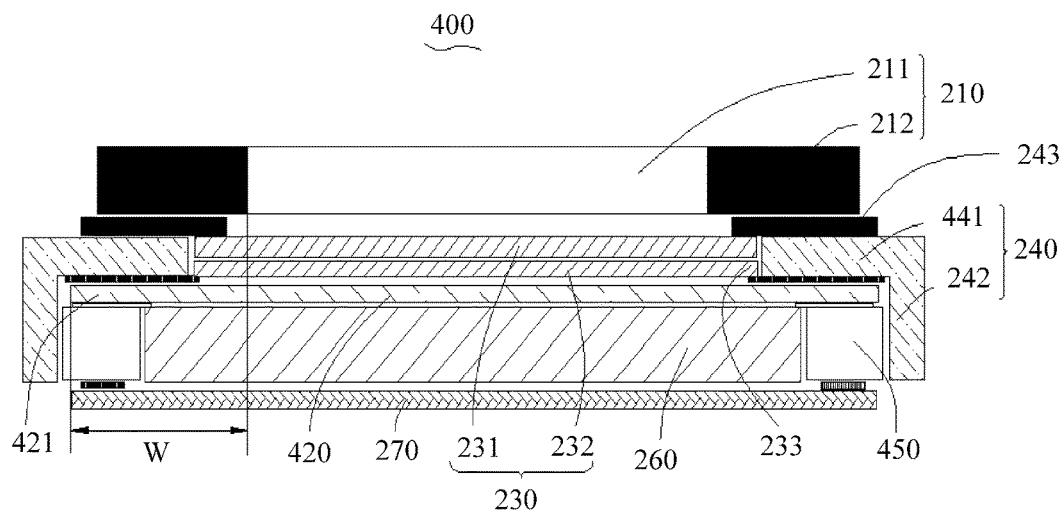
FIG. 3 is a schematic sectional view of a liquid crystal module according to a third exemplary implementation manner of the present disclosure.

FIG. 3 shows a schematic sectional view of a liquid crystal module 400 according to a third exemplary implementation manner of the present disclosure. In the liquid crystal module 400, except that location relationships between a light conversion film 420, a supporting portion 441, and a bearing frame 450 are different from location relationships between the light conversion film 220, the supporting portion 241, and the bearing frame 250 in the liquid crystal module 200, other components, functions of the components, and relationships between the components are the same. Same parts are not further described herein.

In this implementation manner, a first side portion 421 of the light conversion film 420 is disposed between the bearing frame 450 and the supporting portion 441, and bonded onto the bearing frame 450 and the supporting portion 441. In other words, the top of the bearing frame 250 in the liquid crystal module in Embodiment 1 is directly cut off, to leave enough space, which ensures that a redundant area of the light conversion film 420 is greater than or equal to 0.8 mm, that is, a width WW of the first side portion 421 of the light conversion film 420 is greater than or equal to 0.8 mm, and the freed space may further be used to support the first side portion 421 of the light conversion film 420.

Likewise, in the foregoing liquid crystal module 400, a supporting portion 441 is disposed between a first side portion 421 and a light-shielding area 212, and the supporting portion 441 is used to support a liquid crystal panel 210, thereby ensuring that in a case in which there are a manufacturing tolerance and a mounting tolerance, edges of the liquid crystal panel 210 can be supported. In addition, a width W of the first side portion 421 is set to 0.8 mm or more than 0.8 mm, thereby ensuring that a light conversion film 420 can have enough space in a redundant area. This resolves a technical problem in the prior art that after an edge of a quantum dot enhancement film of the liquid crystal module is corroded by oxygen and moisture in the air, the quantum dot enhancement film located below a light-shielding layer has a width of only 0.75 mm, and light leakage may occur at the edge, and achieves a technical effect of preventing light leakage at the edge of the liquid crystal panel.

Embodiment 4

Figure 4:
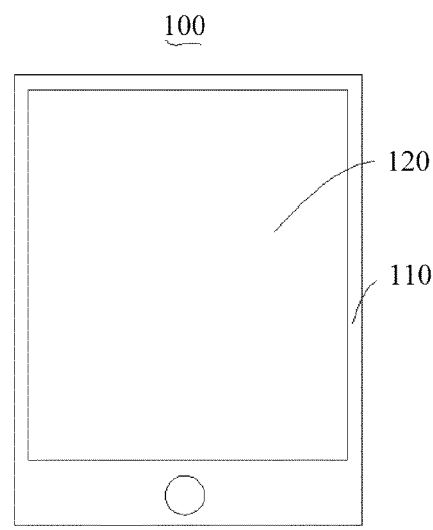
FIG. 4 is a main view of an electronic device having a liquid crystal module according to a fourth exemplary implementation manner of the present disclosure.

FIG. 4 shows a main view of an electronic device 100 according to a fourth exemplary implementation manner of the present disclosure. The electronic device 100 includes a housing 110 and a liquid crystal module 120 and other electronic components that are disposed in the housing 110.

The liquid crystal module 120 may be the liquid crystal module 200 in Embodiment 1, or may be the liquid crystal module 300 in Embodiment 2, or may be the liquid crystal module 400 in Embodiment 3. Therefore, a structure of the liquid crystal module 120 is not further described herein.

In the foregoing electronic device 100, a supporting portion is disposed between a first side portion and a light-shielding area, and the supporting portion is used to support a liquid crystal panel, thereby ensuring that in a case in which there are a manufacturing tolerance and a mounting tolerance, edges of the liquid crystal panel can be supported. In addition, a width W of the first side portion is set to 0.8 mm or more than 0.8 mm, thereby ensuring that a light conversion film can have enough space in a redundant area. This resolves a technical problem in the prior art that after an edge of a quantum dot enhancement film of the liquid crystal module is corroded by oxygen and moisture in the air, the quantum dot enhancement film located below a light-shielding layer has a width of only 0.75 mm, and light leakage may occur at the edge, and achieves a technical effect of preventing light leakage at the edge of the liquid crystal panel.

Although some exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A liquid crystal module comprising:
    a liquid crystal panel comprising a light-admitting area and a light-shielding area located at an edge of the light-admitting area;
    a light conversion film comprising a first side portion disposed opposite the light-shielding area;
    a brightness enhancement film disposed between the liquid crystal panel and the light conversion film;
    a supporting portion disposed between the first side portion and the light-shielding area, wherein the supporting portion is configured to support the liquid crystal panel; and
    a bearing portion, wherein the bearing portion has an upper step surface that supports the supporting portion and a step surface that supports the first side portion.

2. The liquid crystal module of claim 1, wherein the brightness enhancement film comprises a second side portion that is disposed parallel with the supporting portion, between the first side portion and the light-shielding area.

3. The liquid crystal module of claim 1, wherein the supporting portion is made of a metal material.

4. The liquid crystal module of claim 1, wherein a gap exists between the first side portion and the supporting portion.

5. The liquid crystal module of claim 4, wherein the supporting portion is bonded onto the bearing portion.

6. The liquid crystal module of claim 1, wherein the liquid crystal module further comprises a light guide and a reflector, wherein the light guide is disposed between the reflector and the light conversion film, and wherein the reflector is bonded onto the bearing portion.

7. The liquid crystal module of claim 1, wherein the liquid crystal module further comprises a light-shielding tape, wherein the light-shielding tape is used to bond the supporting portion and the light-shielding area.

8. An electronic device comprising:
    a liquid crystal panel comprising a light-admitting area and a light-shielding area located at an edge of the light-admitting area;
    a light conversion film comprising a first side portion disposed opposite the light-shielding area;
    a brightness enhancement film disposed between the liquid crystal panel and the light conversion film;
    a supporting component comprising a supporting portion that is disposed between the first side portion and the light-shielding area, wherein the supporting component is configured to support the liquid crystal panel; and a bearing portion, wherein the bearing portion has an upper step surface that supports the supporting portion and a step surface that supports the first side portion.

9. The electronic device of claim 8, wherein the supporting component is in a frame shape or a bar shape.

10. The electronic device of claim 8, wherein the supporting component is disposed around an edge of the brightness enhancement film.

11. The electronic device of claim 8, wherein the supporting portion is made of a metal material.

12. The electronic device of claim 8, wherein a gap exists between the first side portion and the supporting portion.

13. The electronic device of claim 8, wherein the supporting portion is bonded onto the bearing portion.

14. The electronic device of claim 8, wherein the electronic device further comprises a light guide and a reflector, wherein the light guide is disposed between the reflector and the light conversion film, and wherein the reflector is bonded onto the bearing portion.

15. The electronic device of claim 8, wherein the supporting component further comprises a base portion that is disposed around an edge of the bearing portion and connected to the supporting portion.

16. The electronic device of claim 8, wherein the electronic device further comprises a light-shielding tape used to bond the supporting portion and the light-shielding area.

* * * * *